Dec. 21, 1965    M. TRZEBINSKI    3,224,026
WINDSCREEN WIPERS OF MOTOR VEHICLES
Filed Feb. 14, 1964    2 Sheets-Sheet 1
Fig. 1.
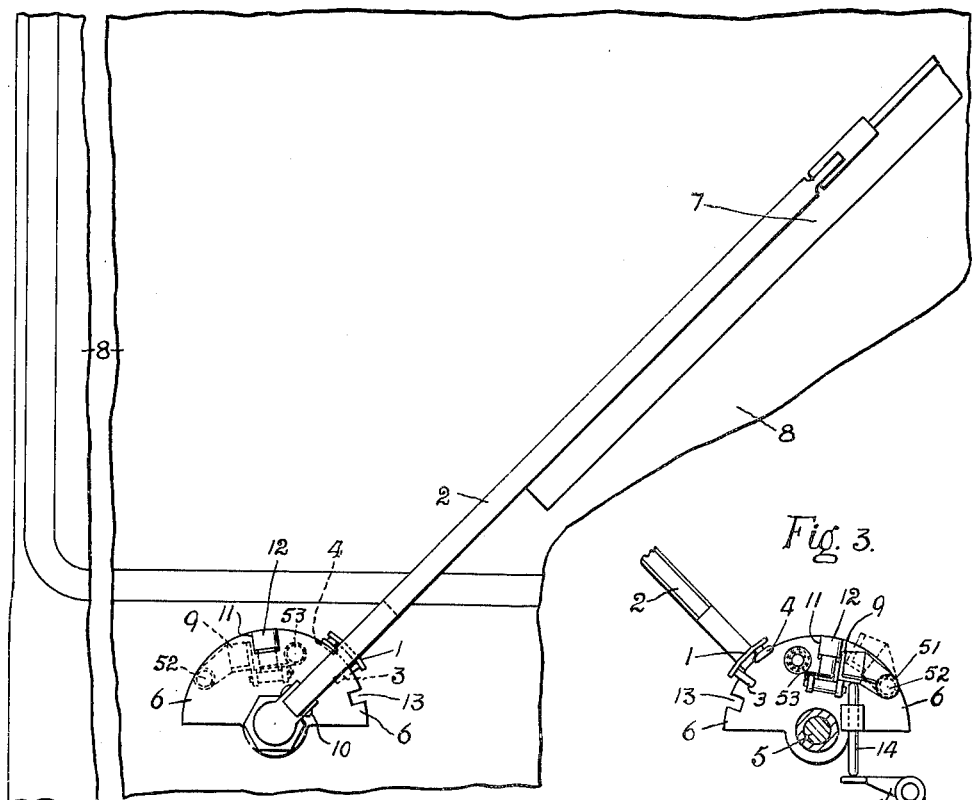
Fig. 3.
Fig. 2.
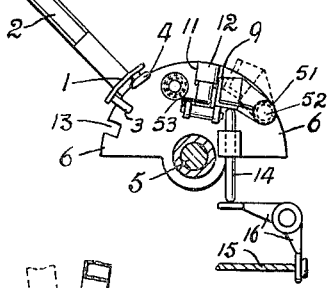
Fig. 4.
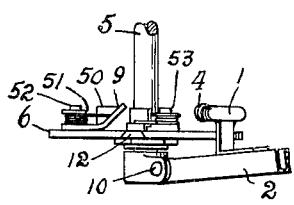
Fig. 6.
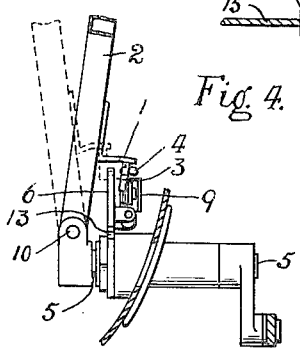
Fig. 5.
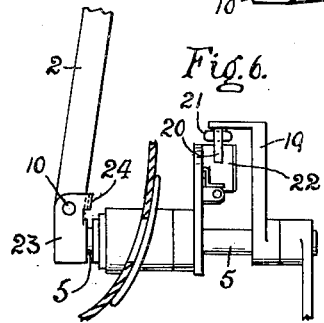
MARIAN TRZEBINSKI
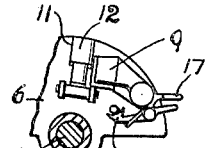
BY Mason, Porter, Diller & Stewart
ATTORNEYS Dec. 21, 1965   M. TRZEBINSKI   3,224,026
WINDSCREEN WIPERS OF MOTOR VEHICLES
Filed Feb. 14, 1964   2 Sheets-Sheet 2
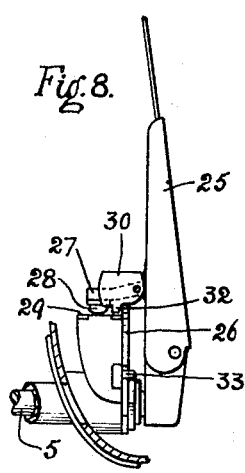
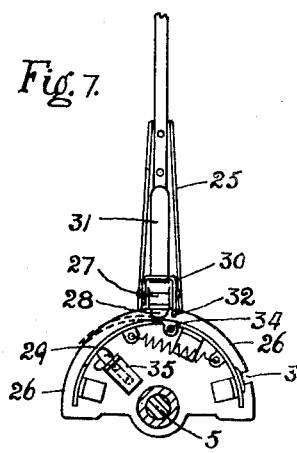
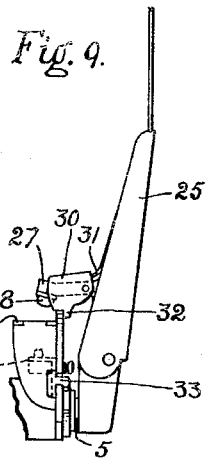
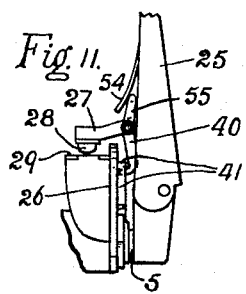
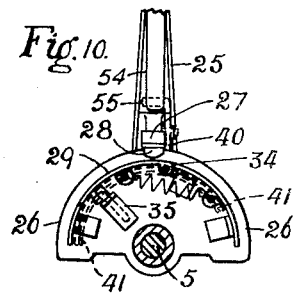
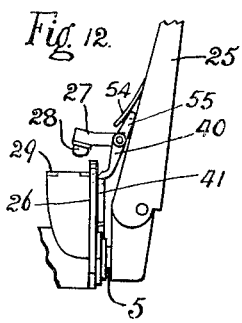
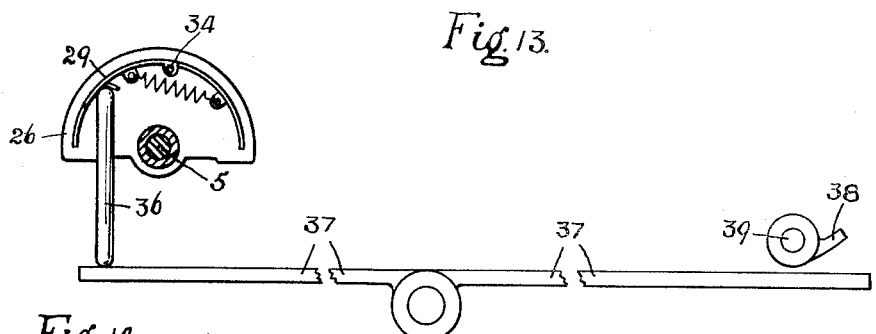
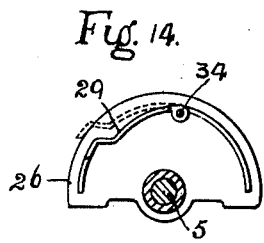
MARIAN TRZEBINSKI
BY   Mason, Porter, Diller & Stewart
ATTORNEYS United States Patent Office 3,224,026
Patented Dec. 21, 1965

3,224,026
WINDSCREEN WIPERS OF MOTOR VEHICLES
Marian Trzebinski, 15 Melton Road, West Bridgford,
Nottingham, England
Filed Feb. 14, 1964, Ser. No. 344,990
14 Claims. (Cl. 15—250.19)

This invention relates to windscreen wipers for motor vehicles of the kind in which wiper blades are carried by arms which are oscillated to move the blades first in one direction and then in the other direction across the windscreen or are moved transversely of the windscreen to remove rain or snow falling thereon. In most cases two wiper blades are provided and are arranged so that they move together in the same direction or are arranged to move in opposite directions when in operation. In either case the wiper blades are held in contact with the windscreen by springs associated with the arms and with windscreen wipers as hitherto constructed the wiper blades maintian contact with the windscreen when moving in both directions. As a result when snow is falling on the windscreen it is moved by the wiper blades into the middle of the windscreen when the blades traverse in that direction, where the snow piles up. The object of the present invention is to provide means which can be brought into operation when required so that the wiper blades only make contact with the windscreen when moving in one direction so that when snow falls on the screen it is always moved to the sides of the windscreen or to one side thereof from where it can fall off onto the ground.

According to this invention means are provided which can be brought into operation to move the arms which carry the wiper blades away from the windscreen and hold the wiper blades clear of the windscreen when the arms are moved in one direction across the windscreen. The arms may be moved away from the windscreen by means associated with the arms or the oscillating spindles which carry the arms may be moved longitudinally in the appropriate direction. In either case provision is made to bring the means provided to move the arm away from the windscreen into operation when desired and more particularly when snow is falling on the windscreen.

The invention will now be more particularly described with reference to the accompanying drawings in which:
FIG. 1 is a front elevation,
FIG. 2 a plan,
FIG. 3 a rear elevation, and
FIG. 4 a side elevation of a windscreen wiper constructed according to this invention.
FIG. 5 is a rear elevation showing an alternative method of raising the cam for withdrawing the wiper arm from the windscreen.
FIG. 6 is a side elevation showing an alternative method of withdrawing the wiper arm from the windscreen.
FIG. 7 is a rear elevation, and
FIG. 8 a side elevation showing a further alternative construction.
FIG. 9 is a side elevation showing the wiper arm in its withdrawn position when moving in one direction.
FIG. 10 is a rear elevation, and
FIG. 11 is a side elevation showing a further alternative construction.
FIG. 12 is a side elevation showing the wiper arm in its withdrawn position when moving in one direction.
FIG. 13 is a rear elevation showing an alternative method of raising the cam for withdrawing the wiper arm from the windscreen, and
FIG. 14 shows an alternative form of cam.

Like numerals indicate like parts throughout the drawings.

In carrying out this invention, in one method shown in FIGS. 1 to 4, a bracket 1 is secured to each wiper arm 2 and this bracket carries a pin 3 and a roller 4. The arm 2 is secured on an oscillating shaft 5 in well known manner and the shaft 5 passes through the centre of a fixed plate 6 having a substantially semi-circular periphery. The pin 3 and roller 4 on the bracket 1 are normally behind the plate 6. When the shaft 5 oscillates the bracket 1 moves round the plate carrying the pin 3 and roller 4 with it and normally the wiper blade 7 will wipe in both directions. In order to move the wiper blade 7 clear of the windscreen 8 when moving in one direction, say towards the centre of the windscreen the following arrangement is adopted.

Mounted on the plate 6 is an abutment or cam 9 which can be raised when desired into the position shown in broken lines in FIG. 3 where it is in the path of the roller 4 on the bracket 1 and the abutment or cam 9 is located on the plate 6 so that the roller 4 engages therewith just before the arm 2 reaches the end of its traverse towards the side of the windscreen. The abutment or cam 9 has a platform 50 (FIGURE 2) upon which rests an extended portion of a coil spring 51 which spring 51 is mounted coaxially about a pivot shaft 52 of the abutment or cam 9 on the plate 6, to urge the abutment or cam 9 downwardly, as shown in the FIGURE 3. When the roller 4 engages the cam 9 it turns the arm 2 about the pivot 10 normally provided therein and moves the arm 2 away from the windscreen. At the same time the pin 3 on the bracket 1 is moved through a gate 11 in the periphery of the plate 6 to the front side of the plate 6. Also, the roller 4, being urged by the cam 9 toward the plate 6, rides over the plate 6 as the pin 3 passes through the gate 11. As best shown in FIGURES 1 and 3, the pin 3 extends farther from the bracket 1 than the roller 4 so that while the roller 4 rides over the plate 6, the pin 3 goes through the gate 11 in the plate 6. This gate 11 is provided with a spring operated closing member 12 which normally closes the gate 11 through the urging of a coil spring 53 but is moved against its spring 53 by the pin 3 to allow the latter to pass through the gate 11 to the front side of the plate 6 and the member 12 through the urging of the spring 53 then closes the gate 11. On the return motion of the arm 2 the pin 3 rides over the member 12 and returns to its other extreme position on the front side of the plate 6 holding the arm 2 in the position shown in broken lines in FIG. 4 where the wiper blade 7 is clear of the windscreen 8. On the arm 2 reaching its inner extreme position the pin 3 drops through a gap 13 provided in the periphery of the plate 6 while the roller 4 rides back over the plate 6 to its position shown in the FIGURES 1 through 4. The pin 3 thus returns to its normal position at the rear of the plate 6 and the wiper blade 7 re-engages with the windscreen 8 to wipe on the next motion of the arm 2 towards the side of the windscreen 8.

The abutment or cam 9 on the plate 6 is moved into and out of its operative position in any convenient manner by mechanical, manually or electrically operated means.

For this purpose the cam 9 may be raised into the path of the roller 4 by a longitudinally movable rod 14 which is moved longitudinally by a flexible cable 15 operated from a convenient position, the cable 15 may be arranged to operate a lever 16 to move the rod 14. Alternatively the cam 9 may be provided with a tail 17 (see FIG. 5) which is manually depressed to raise the cam 9 and a releasable catch 18 provided to hold the cam 9 in its raised position until normal working is again required.

In an alternative arrangement shown in FIG. 6 the oscillating shaft 5 which carries the wiper arm 2 is moved longitudinally to move the arm away from the windscreen 8. For this purpose a bracket 19 which carries a pin 20 and roller 21 is mounted on the shaft 5 and operates in similar manner to that previously described so that when the cam 22 is moved into its operative position and the roller 21 engages therewith, the shaft 5 is moved longitudinally against action of a return spring to move the arm 2 away from the windscreen. The wiper arm as normally constructed is pivoted at 10 to a member 23 secured on the shaft 5 and a spring is provided to exert pressure on the arm and on the wiper blade carried thereby. In order to prevent the spring associated with the arm holding the wiper blade in contact with the windscreen when the shaft 5 is moved longitudinally, a stop 24 is provided to limit the movement of the spring actuated part of the arm towards the windscreen.

Instead of having a pin on the bracket to engage with the plate during the return motion of the arm, a detent may be mounted on the bracket and be adapted to engage with the plate when the shaft is moved longitudinally and hold the shaft with the wiper arm withdrawn from the windscreen as the arm makes its return motion and until the detent registers with an opening in the plate through which the detent passes and allows the shaft to return to its initial position. The arrangement operates in a similar manner to the detent described in connection with the alternative method shown in FIGS. 7 to 9.

In an alternative method of carrying out this invention shown in FIGS. 7 to 9 the wiper arm 25 is mounted in the normal manner on an oscillating spindle 5 driven in well known manner by an electric motor to move a wiper blade backwards and forwards over a windscreen. Mounted coaxially with the spindle 5 is a substantially semi-circular plate 26 and secured on the arm 25 is a bracket 27 which moves with the arm on a path near to the periphery of the plate 26. Mounted on the bracket 27 is a stud 28 and near to one end of the path traversed by the stud is a cam member 29, see FIG. 7, which is movable into the path of the stud 28. The member 29 is adapted, when engaged with the stud 28, to move the wiper arm 25 sufficiently far away from the windscreen to move the wiper blade carried by the arm clear of the windscreen. In order to hold the wiper arm 25 in its retracted position whilst it makes its return movement to the other end of its traverse, a detent 30 is pivoted on the bracket 27. When the arm 25 is in its normal wiping position as shown in FIGS. 7 and 8, the detent 30 rides on the periphery of the plate 26 as shown in FIG. 8 but when the arm 25 is moved to its retracted position by raising the member 29 a spring 31 associated with the detent 30 moves it so that a claw 32 on the detent 30 engages with the outer face of the plate 26 as shown in FIG. 9, to hold the arm 25 in its retracted position as it moves away from the member 29. When the arm 25 reaches the other end of its traverse the detent 30 is in alignment with an opening 33 formed in the edge of the plate 26. The opening 33 is large enough for the detent 30 to pass through so that the spring normally associated with the arm 25 moves the latter back to its normal wiping position for the next traverse of the arm. The member 29 for engaging with the stud 28 on the bracket 27 is preferably located so that the wiper arm is held in its retracted position during its movement from the side of the windscreen towards the centre thereof.

The member 29 provided to engage with the stud 28 on the bracket 27 may be in the form of a lever pivoted at one end at 34 and normally lying out of the path of the stud 28 on the bracket 27 so that when the member 29 is in its normal position the wiper operates in the normal manner. When it is desired to operate the wiper so that it is clear of the screen when moving in one direction, say from the side of the screen to the centre thereof, the member 29 is raised to engage with the stud 28 on the bracket 27 and retract the wiper arm 25 from the windscreen.

The member 29 is raised about its pivot 34 into the position shown in broken lines in FIG. 7 into the path of the stud 28 in any convenient manner. For this purpose it may be raised by a manually operated slide 35 on the plate 26, the slide 35 being adapted to raise the member 29 and hold it in its raised position until released by returning the slide 35 to its initial position. Alternatively the member 29 may be raised by a longitudinally adjustable rod 36 moved by a flexible cable in a similar manner to that in connection with the previously described arrangement, or the rod 36 may be adjusted by a lever 37 actuated by a cam 38 on the motor driven shaft 39 from which the oscillating motion of the wiper arm spindle 5 is obtained and shown in FIG. 13.

When the cam 29 is left in its operative position after being moved thereto, it is preferably shaped as shown in FIG. 14 so that the wiper arm is not moved away from the windscreen until it is near the end of its traverse when moving in the appropriate direction.

FIGS. 10 to 12 show a modification of the arrangement shown in FIGS. 7 to 9. In this modified arrangement the detent 30 is replaced by the pawl 40 which is pivoted on the bracket 27. A leaf spring 54, journaled within the arm 25, engages an upper extension of the pawl 40 and urges it in a clockwise direction as viewed in the FIGURE 11. By this arrangement, the cooperation of the lower extension of the pawl 40 with the rib 41 biases the wiper arm 25 away from the windscreen. When the wiper arm 25 is operating normally, that is wiping in both directions, the lower end of the pawl 40 moves below a rib 41 on the front of the plate 26. When the member 29 is raised and the wiper arm moved away from the windscreen the lower end of the pawl 40 moves on to the top of the rib 41 as shown in FIG. 12 and the arm 25 held in its retracted position on its return motion until the pawl reaches the end of the rib 41 and allows the arm 25 to return to its normal position.

The foregoing description refers to one wiper arm but it will be understood that when a second wiper arm is provided, as is usual, the second wiper arm will be constructed in a similar manner to that hereinbefore described. The two arms may be arranged so that when they are operating to wipe the windscreen in one direction only, they wipe when moving from the centre of the windscreen to the sides thereof so that snow falling on the windscreen is always carried to the sides thereof.

With a windscreen wiper in which the two arms move together in the same direction the movement of the arms away from the windscreen may be arranged so that both arms wipe when moving in the same direction so that one arm moves snow towards the centre of the windscreen where it is picked up by the other arms and carried to the side of the windscreen.

With the kind of windscreen wiper which moves backwards and forwards transversely of the windscreen a similar arrangement to that described may be provided to raise the wiper blade clear of the windscreen when moving in one direction. For this purpose the bracket on the arm operates in conjunction with a longitudinal plate instead of the substantially semi-circular plate.

What I claim is:

1. A windscreen wiper having an arm, a wiper blade supported by said arm and capable of backward and forward movements of operation across a windscreen and means associated with the arm for withdrawing the arm from the windscreen during one movement of operation, said means including a plate positioned away from but in a plane substantially parallel to the plane of movement of said arm, a bracket supported by said arm, a first member mounted on said bracket, a positionable cam supported by said plate and movable to engage said first member for withdrawing said arm and wiper blade away from the windscreen, and a second member supported by said bracket for maintaining said arm and blade in the withdrawn position during one movement of operation.

2. A windscreen wiper comprising a wiper arm mounted on an oscillating shaft, a substantially semi-circular plate fixed concentric with the shaft, a bracket movable with the arm and having an abutment thereon, a cam on the plate, means to move the cam into the path of the abutment when the arm is moving in one direction, a pin on the bracket, a gate in the plate for the pin to pass through as the cam moves the wiper arm away from the windscreen, a spring pressed closure member for the gate and an opening in the plate for the pin to pass through when the wiper arm reaches the end of its traverse in the other direction.

3. The combination as defined in claim 2 wherein said means to move the cam includes a longitudinally adjustable rod actuated manually to engage said cam and thereby urge said wiper arm away from the windscreen.

4. A windscreen wiper according to claim 2 in which the cam is moved into the path of the abutment by manually adjusting the position of the cam, releasable means being provided to hold the cam in the path of the abutment.

5. A windscreen wiper comprising a wiper arm mounted on an oscillating shaft, a substantially semi-circular plate fixed concentric with the shaft, a bracket on the arm having an abutment thereon, a cam on the plate, means to move the cam into the path of the abutment when the arm is moving in one direction, a spring pressed detent on the bracket, a claw on the detent to engage with the front of the plate when the arm is moving in the reverse direction and an opening in the plate to release the detent when the arm reaches the end of its traverse in the other direction.

6. A windscreen wiper according to claim 5 in which the plate is formed with a rib on its front side, concentric with the shaft and the detent is in the form of a pawl which moves into engagement with the outer side of the rib when the wiper arm is moved away from the windscreen after the abutment on the bracket engages the cam as the arm is moving in one direction and holds the wiper arm in its withdrawn position as it moves in the reverse direction until the pawl reaches the end of the rib.

7. A windscreen wiper according to claim 6 including a longitudinally adjustable rod and the cam is moved into the path of the abutment by said longitudinally adjustable rod to thereby urge said wiper arm away from the windscreen.

8. A windscreen wiper comprising a wiper arm mounted on an oscillating shaft, a substantially semi-circular plate fixed concentric with the shaft, a bracket on the shaft having an abutment thereon, a cam on the plate, means to move the cam into the path of the abutment to move the shaft longitudinally and move the wiper arm away from the windscreen when moving in one direction, a pin on the bracket, a gate in the plate for the pin to pass through as the cam moves the wiper arm away from the windscreen, a spring pressed closure member for the gate and an opening in the plate for the pin to pass through when the wiper arm reaches the end of its traverse in the other direction.

9. A windscreen wiper having an arm, a wiper blade supported by said arm and capable of backward and forward movements of operation across a windscreen and means associated with the arm for withdrawing the arm from the windscreen during one movement of operation, said means including a plate positioned away from but in a plane substantially parallel to the plane of movement of said arm, a bracket supported by said arm, a member mounted on said bracket, and a movable cam supported by said plate and selectively positionable to engage said member for withdrawing said arm and wiper blade from the windscreen.

10. A windscreen wiper having an arm, a wiper blade supported by said arm and capable of backward and forward movements of operation across a windscreen and means associated with the arm for withdrawing the arm from the windscreen during one movement of operation, said means including a plate positioned away from but in a plane substantially parallel to the plane of movement of said arm, a bracket supported by said arm, a roller mounted on said bracket for providing rolling engagement with said arm, a positionable cam supported by said plate and movable to engage said roller for withdrawing said arm and wiper blade away from the windscreen, and a second member supported by said bracket for maintaining said arm and blade in the withdrawn position during one movement of operation.

11. A windscreen wiper having an arm, a wiper blade supported by said arm and capable of backward and forward movements of operation across a windscreen and means associated with the arm for withdrawing the arm from the windscreen during one movement of operation, said means including a plate having a pair of substantially parallel flat surfaces and positioned away from but in a plane substantially parallel to the plane of movement of said arm, a bracket supported by said arm, a first member mounted on said bracket, a positionable cam supported by said plate and movable to engage said first member for withdrawing said arm and wiper blade away from the windscreen, and a pin supported by said bracket for maintaining said arm and blade in the withdrawn position during one movement of operation, said pin engaging one flat surface of said plate during one movement of operation and the other flat surface of said plate during the other movement of operation.

12. A windscreen wiper having an arm, a wiper blade supported by said arm and capable of backward and forward movements of operation across a windscreen and means associated with the arm for withdrawing the arm from the windscreen during one movement of operation, said means including a plate positioned away from but in a plane substantially parallel to the plane of movement of said arm, a bracket supported by said arm, a first member mounted on said bracket, a positionable cam supported by said plate and movable to engage said first member for withdrawing said arm and wiper blade away from the windscreen, a second member supported by said bracket for maintaining said arm and blade in the withdrawn position during one movement of operation, and means on said plate and cooperating with said second member for restoring said arm and wiper blade to its other movement of operation wherein said wiper blade engages the windscreen.

13. The combination as defined in claim 12 wherein said means for restoring is a notch formed in said plate for permitting the entry of said second member to thereby permit the pivoting of said arm to cause said wiper blade to engage the windscreen.

14. A windscreen system comprising a first wiper assembly having an arm, a wiper blade supported by said arm and capable of backward and forward movements of operation across a windscreen and means associated with the arm for withdrawing the arm from the windscreen during one movement of operation, said means including a plate positioned away from but in a plane substantially parallel to the plane of movement of said arm, a bracket supported by said arm, a first member mounted on said bracket, a positionable cam supported by said plate and movable to engage said first member for withdrawing said arm and wiper blade away from the windscreen, a second member supported by said bracket for maintaining said arm and blade in the withdrawn position during one movement of operation, a second wiper assembly substantially identical to said first wiper assembly, and arranged so that said first wiper blade wipes only when moving from a side toward the center of the windscreen and said second wiper blade wipes when moving from the center toward the other side of the windscreen, so as to progressively traverse a path of engagement with the windscreen from one side to the other side.

References Cited by the Examiner

UNITED STATES PATENTS

| | | | |
|---|---|---|---|
| 1,077,402 | 11/1913 | Ford | 15—250.19 |
| 1,832,083 | 11/1931 | Bornstein | 15—250.19 X |
| 2,063,055 | 12/1936 | Shaw | 15—250.19 |

FOREIGN PATENTS 665,375  9/1938  Germany.

CHARLES A. WILLMUTH, *Primary Examiner.*